(12) United States Patent
Lee et al.

(10) Patent No.: US 9,168,960 B2
(45) Date of Patent: Oct. 27, 2015

(54) SPOILER APPARATUS OF REAR BUMPER FOR VEHICLE

(71) Applicant: Hyundai Motor Company, Seoul (KR)

(72) Inventors: Seung Mok Lee, Osan-si (KR); Hyun Gyung Kim, Hwaseong-si (KR); Dong Eun Cha, Suwon-si (KR); Phil Jung Jeong, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/458,654

(22) Filed: Aug. 13, 2014

(65) Prior Publication Data
US 2015/0166130 A1 Jun. 18, 2015

(30) Foreign Application Priority Data
Dec. 13, 2013 (KR) .................. 10-2013-0155490

(51) Int. Cl.
*B62D 35/00* (2006.01)
*B60R 19/48* (2006.01)
*B60R 19/38* (2006.01)
*B60R 19/12* (2006.01)

(52) U.S. Cl.
CPC .............. *B62D 35/007* (2013.01); *B60R 19/38* (2013.01); *B60R 19/48* (2013.01); *B60R 19/12* (2013.01)

(58) Field of Classification Search
CPC ........ B60R 19/12; B60R 19/38; B60R 19/48; B62D 35/007
See application file for complete search history.

(56) References Cited

U.S. PATENT DOCUMENTS

| | | | |
|---|---|---|---|
| 6,196,620 B1 * | 3/2001 | Haraway, Jr. .............. | 296/180.5 |
| 6,637,805 B2 * | 10/2003 | Rees .......................... | 296/180.1 |
| 6,742,831 B2 * | 6/2004 | Rees .......................... | 296/180.1 |
| 7,517,004 B2 * | 4/2009 | Honeycutt ................. | 296/180.1 |
| 7,854,467 B2 * | 12/2010 | McKnight et al. ......... | 296/180.1 |

FOREIGN PATENT DOCUMENTS

| | | |
|---|---|---|
| JP | 2006-219074 A | 8/2006 |
| KR | 100207192 B1 | 4/1999 |
| KR | 10-1039830 B1 | 6/2011 |

* cited by examiner

*Primary Examiner* — Lori L Lyjak
(74) *Attorney, Agent, or Firm* — Morgan, Lewis & Bockius LLP

(57) ABSTRACT

A spoiler apparatus for a rear bumper of a vehicle may include a spoiler rod that is selectively movable forward/backward through a hole of a rear back beam, and a spoiler panel coupled to a rear end of the spoiler rod and selectively engaged with the rear bumper, wherein the spoiler panel separates and protrudes backward from the rear bumper, as the spoiler rod moves backward.

17 Claims, 4 Drawing Sheets

SPOILER APPARATUS OF REAR BUMPER FOR VEHICLE

CROSS-REFERENCE TO RELATED APPLICATION

The present application claims priority to Korean Patent Application No. 10-2013-0155490 filed Dec. 13, 2013, the entire contents of which is incorporated herein for all purposes by this reference.

BACKGROUND OF THE INVENTION

1. Field of the Invention

The present invention relates to a spoiler apparatus for the rear bumper of a vehicle, and more particularly to a spoiler apparatus for the rear bumper of a vehicle, which actively changes the amount of protrusion in accordance with the speed of the vehicle.

2. Description of Related Art

Vehicles are lifted up with an increase in speed when traveling, and in this case, the contact force of the tires on the ground decreases, so stability in traveling is deteriorated and there is a limit in acceleration of the vehicles.

In order to prevent this problem, a mount for pressing down the vehicle bodies are needed and the one corresponding to the mount is a spoiler, which is also called an air spoiler because it usually changes the flow of air.

The spoiler falls into a nose spoiler which is mounted at the front of a vehicle, a roof spoiler which is mounted on the roof, and a tail spoiler which is mounted at the rear end, and FIG. 1 shows the configuration of a fixed rear spoiler 3 mounted under a rear bumper face 1 by a bolt 2.

However, such fixed spoilers has a defect that they cause noise when vehicles travel at low speeds, particularly they are damaged or broken when coming in contact with objects on the ground because they reduce the height of vehicles from the ground.

In order to prevent the defect, spoilers are mounted upward on vehicle bodies or extended rearward, but these types also have a defect that it is difficult to mount the spoilers due to the limit in specifications of vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a spoiler apparatus for the rear bumper of a vehicle which functions as a rear bumper when a vehicle is in stop or travels at a low speed and functions as a spoiler by protruding from the rear bumper when a vehicle travels at a high speed.

Further, the present invention is made to improve the aerodynamic performance of a vehicle to an optimum level in accordance with the vehicle speed by actively changing the amount of protrusion from a rear bumper in accordance with the vehicle speed.

In an aspect of the present invention, a spoiler apparatus for a rear bumper of a vehicle, may include a spoiler rod that is selectively movable forward/backward through a hole of a rear back beam, and a spoiler panel coupled to a rear end of the spoiler rod and selectively engaged with the rear bumper, wherein the spoiler panel separates and protrudes backward from the rear bumper, as the spoiler rod moves backward.

The spoiler apparatus may further may include an actuating unit connected to the spoiler rod to selectively transmit power to the spoiler rod in order to move the spoiler rod forward or backward, a control unit controlling an operation of the actuating unit, and an input unit transmitting an input signal related to the vehicle speed to the control unit.

The spoiler apparatus may further may include shield panels connected to the rear bumper and the spoiler panel to cover openings between the rear bumper and the spoiler panel, when the spoiler panel separates from the rear bumper and protrudes backward.

The shield panels are bellows that selectively change in length in accordance with an amount of backward protrusion of the spoiler panel.

The shield panels may include a lower shield panel connecting a lower end of the rear bumper and the lower end of the spoiler panel so as to prevent inflow of external air and foreign substances by cutting connection with the outside when the spoiler panel may have protruded backward.

The shield panels may include an upper shield panel, and a plurality of holes that discharge air in the rear bumper to the outside when the spoiler panel may have protruded backward are formed in the upper shield panel connecting an upper end of the spoiler panel and the rear bumper.

The spoiler panel protrudes while moving upward in order to prevent a reduction of a height of the vehicle from a ground, when protruding backward.

A guide protrusion that protrudes downward is formed at the spoiler rod to guide the spoiler panel to protrude backward and upward, and a guide flange guiding the guide protrusion to move upward in contact with the guide protrusion is fitted in the hole formed in the rear back beam through which the spoiler rod is disposed.

The hole formed through the rear back beam may have a height larger than a thickness of the spoiler rod to move up the spoiler rod protruding backward.

A one side of the guide protrusion which comes in contact with the guide flange when the spoiler rod moves backward is an inclined surface for an inclined movement of the spoiler rod protruding backward.

A sub-guide assembly that additionally guides the spoiler rod to stably move upward and backward is provided for the spoiler rod and the rear back beam, wherein the sub-guide assembly may include a back beam bracket combined with the rear back beam, a guide bracket combined with the back beam bracket and having a guide slot formed along a backward and upward movement path of the spoiler rod, a roller shaft disposed through the guide slot to be movable along the guide slot, and a roller shaft bracket having one end coupled to the spoiler rod and another end where the roller shaft is rotatably coupled.

The guide slot may include a straight section extending forward and backward in an axial direction of the spoiler rod, and an inclined section extending from the straight section, at a same angle as the inclined surface of the guide protrusion.

A guide box protruding backward and opening backward is fixed to a back panel ahead of the rear back beam, and a front portion of the spoiler rod is inserted into the guide box and additionally guides the spoiler rod to stably move backward.

The spoiler panel keeps a same level as the rear bumper at a predetermined vehicle speed or less, and protrudes backwards from the rear bumper at a speed higher than the predetermined vehicle speed.

An amount of protrusion of the spoiler panel changes in accordance with a vehicle speed.

In another aspect of the present invention, a spoiler apparatus for a rear bumper of the vehicle may include a spoiler panel that keeps a same level as the rear bumper of the vehicle at a predetermined vehicle speed or less, and that protrudes from the rear bumper at a speed higher than the predetermined vehicle speed.

According to the present invention, a spoiler functions as a rear bumper when a vehicle is in stop and traveling at a low speed, and it functions as a spoiler by protruding from a rear bumper when a vehicle travels at a high speed. Further, the amount of protrusion of the spoiler panel actively changes in accordance with the vehicle speed. Therefore, it is possible to achieve the optimum aerodynamic performance in accordance with the vehicle speed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Noon The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
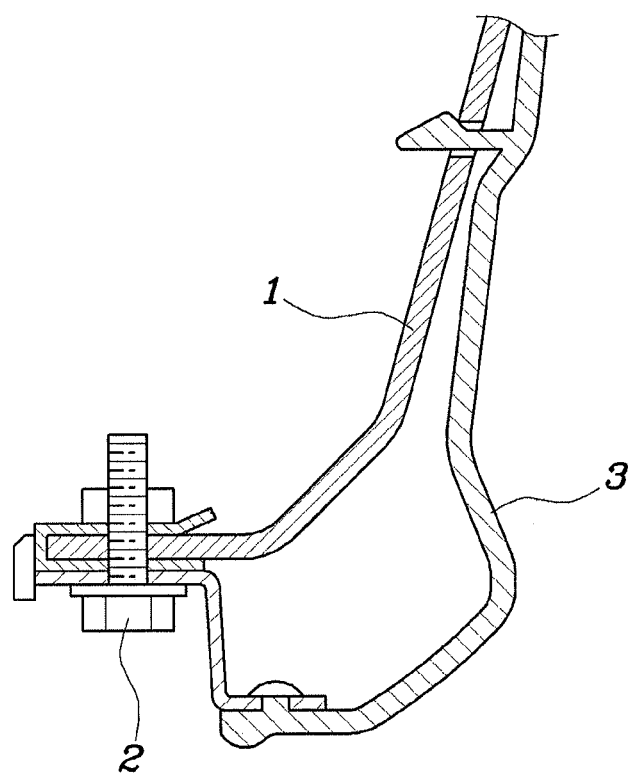
FIG. 1 is a view illustrating a rear spoiler of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A spoiler apparatus for the rear bumper of a vehicle according to embodiments of the present invention is described hereafter in detail with reference to the accompanying drawings.

Figure 2:
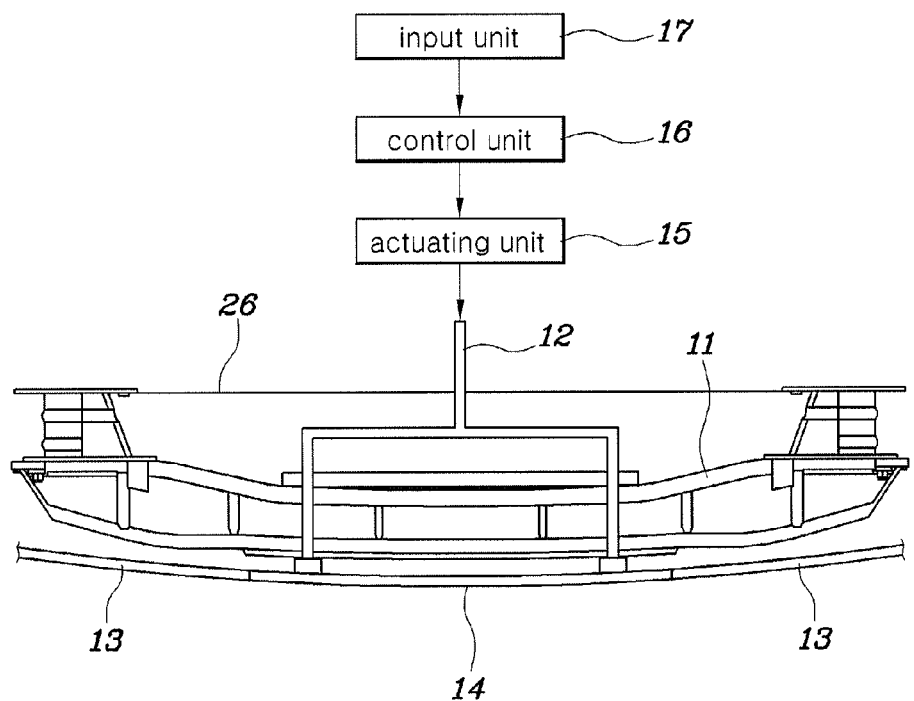
FIG. 2 is a diagram illustrating a spoiler apparatus for the rear bumper of a vehicle according to an exemplary embodiment of the present invention.
Figure 3:
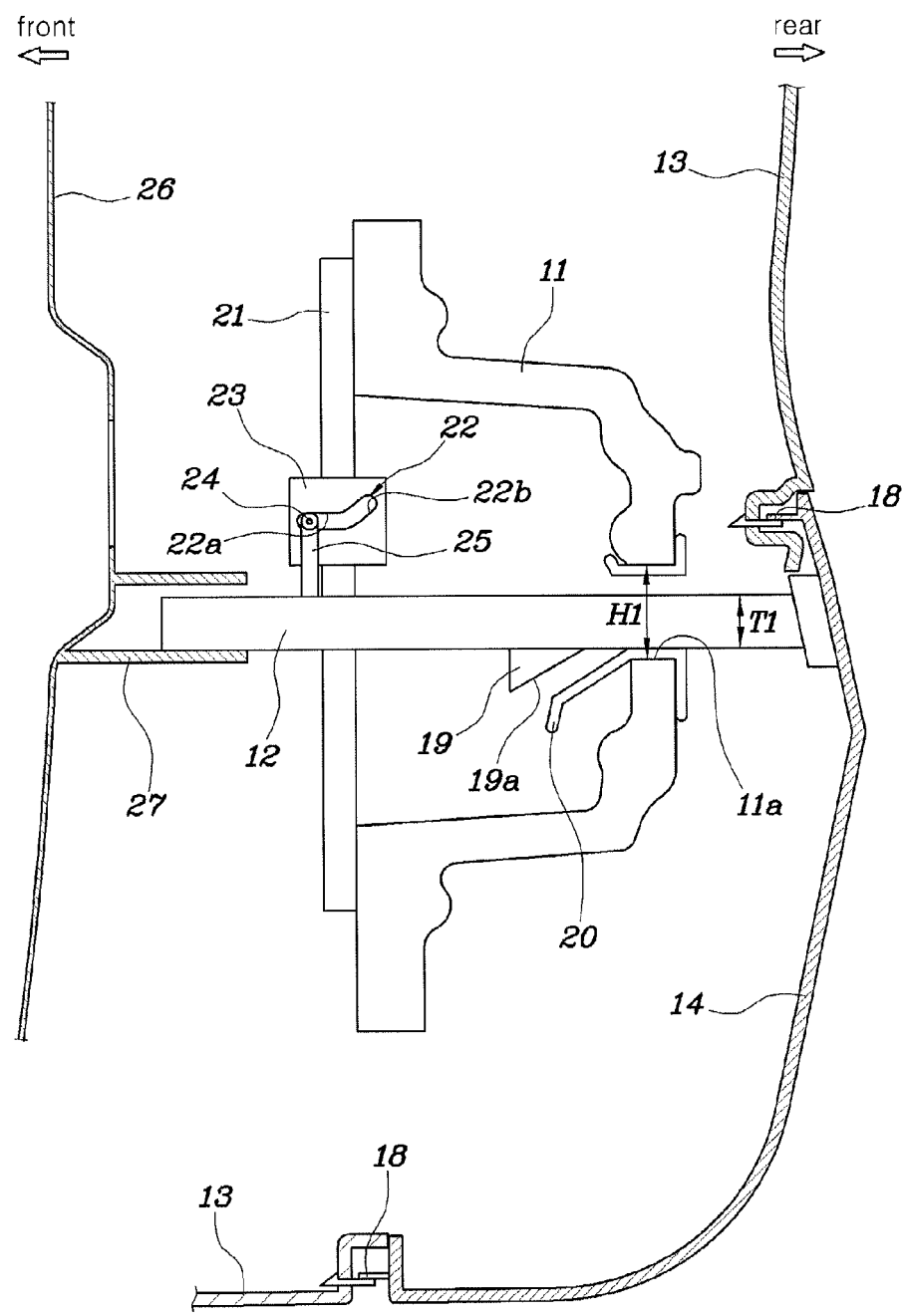
FIG. 3 is a cross-sectional view illustrating the spoiler apparatus for the rear bumper according to an exemplary embodiment of the present invention before operating.
Figure 4:
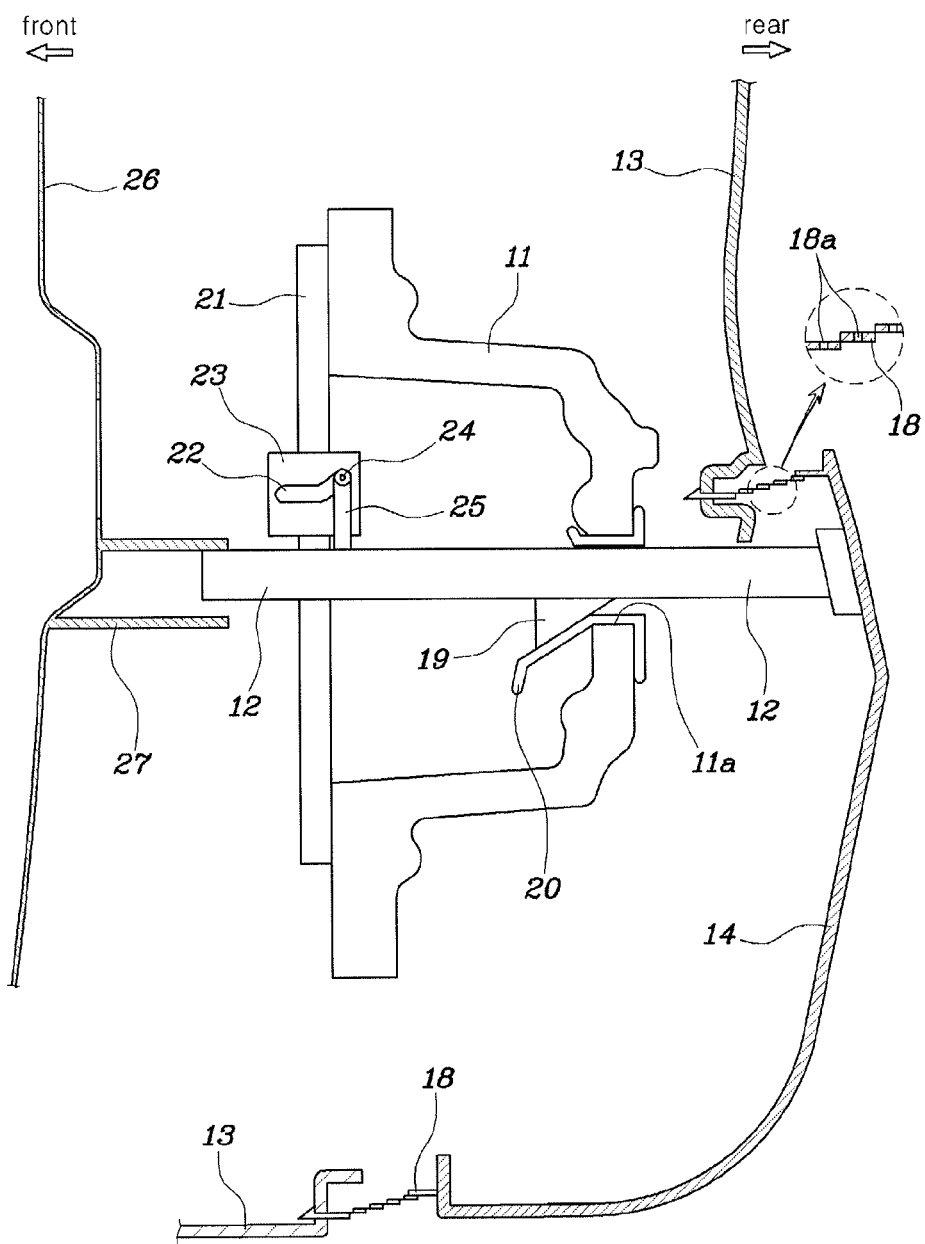
FIG. 4 is a view illustrating the spoiler apparatus for the rear bumper according to an exemplary embodiment of the present invention which is in operation.

A spoiler apparatus for the rear bumper of a vehicle according to an exemplary embodiment of the present invention includes, as shown in FIGS. 2 to 4, a spoiler rod 12 that is movable forward/backward through a rear back beam 11 and a spoiler panel 14 that is coupled to the rear end of the spoiler rod 12 and separates from a rear bumper 13 and protrudes backward when the spoiler rod 12 moves backward.

The spoiler apparatus for the rear bumper of a vehicle according to an exemplary embodiment of the present invention actively changes the amount of backward protrusion of the spoiler panel 14, depending on the vehicle speed, and for this configuration, it further includes an actuating unit 15 that is connected to the spoiler rod 12 and transmits power to it in order to move the spoiler rod 12 forward/backward, a control unit 16 that controls the operation of the actuating unit 15, and an input unit 17 that transmits input signals related to the vehicle speed to the control unit 16.

The actuating unit 15 may include mechanical parts such as a motor driven by control of the control unit 16 and a rack and a pinion that transmit the power from the motor to the spoiler rod 12.

The input unit 17 may include a vehicle speed sensor, and a signal input device such as a switch, if necessary.

The apparatus according to an exemplary embodiment of the present invention further includes shield panels 18 connected to the rear bumper 13 and the spoiler panel 14 to be able to close an opening between the rear bumper 13 and the spoiler panel 14, when the spoiler panel 14 protrudes backward, separating from the rear bumper 13, in which the shield panels 18 may be bellows capable of changing in length to extend and retract in accordance with the amount of backward protrusion of the spoiler panel 14 or elastic members capable of changing the length.

The lower shield panel 18 connecting the lower end of the rear bumper 13 and the lower end of the spoiler panel 14 is a sealing shield panel that can prevent inflow of external air and foreign substances by cutting the connection with the outside when the spoiler panel 14 protrudes backward.

The upper shield panel 18 connecting the upper end of the spoiler panel 14 and the rear bumper 13 has a plurality of holes 18a to be able to discharge the air in the rear bumper 13 to the outside when the spoiler panel 14 protrudes backward.

The present invention may have the structure in which the spoiler panel 14 moves upward while protruding backward, to be able to prevent the height of a vehicle from the ground from decreasing when the spoiler panel 14 protrudes backward.

For this structure, a guide protrusion 19 protruding downward from the spoiler rod 12 is formed and an inclined guide flange 20 guiding the guide protrusion 19 to move upward in contact with the guide protrusion 19 is fitted in a hole 11a formed in the rear back beam 11 through which the spoiler rod 12 is disposed.

The hole 11a formed through the rear back beam 11 may have a height H1 larger than the thickness T1 of the spoiler rod 12 to move up the spoiler rod 12 protruding backward.

The one side of the guide protrusion 19 which comes in contact with the guide flange 20 when the spoiler rod 12 moves backward may be an inclined surface 19a that is inclined downward and forward at a predetermined angle for smooth upward movement of the spoiler rod 12 protruding backward.

Further, a sub-guide assembly that additionally guides the spoiler rod 12 to stably move upward and backward is provided for the spoiler rod 12 and the rear back beam 11.

The sub-guide assembly includes: a back beam bracket 21 combined with the rear back beam 11, a guide bracket 23 combined with the back beam bracket 21 and having a guide slot 22 formed along the backward and upward movement path of the spoiler rod 12, a roller shaft 24 disposed through the guide slot 22 to be movable along the guide slot 22, and a roller shaft bracket 25 having one end coupled to the spoiler rod 12 and another end where the roller shaft 24 is rotatably coupled.

The sub-guide assembly is positioned ahead of the guide protrusion 19 combined with the spoiler rod 12.

The guide slot 22 includes a straight section 22a extending forward/backward and an inclined section 22b extending from the straight section 22a, at the same angle as the inclined surface 19a of the guide protrusion 19.

Further, in the apparatus according to an exemplary embodiment of the present invention, a guide box 27 protruding backward and opening backward is fixed to the back panel 26 ahead of the rear back beam 11, and the front portion of the spoiler rod 12 is inserted into the guide box 27 and additionally guides the spoiler rod 12 to stably move backward.

The operation of an exemplary embodiment of the present invention is described hereafter.

FIG. 3 shows the spoiler apparatus for a rear bumper according to an exemplary embodiment of the present invention which is in stop, in which a vehicle is in stop or traveling at a low speed.

As the speed of the vehicle increases over a predetermined level from the state shown in FIG. 3, the actuating unit 15 is driven by control of the control unit 16 receiving a signal from the input unit 17 and the driving force of the actuating unit 15 is transmitted to the spoiler rod 12.

Then, the spoiler rod 12 moves backward, as in FIG. 4, and the spoiler panel 14 separates from the rear bumper 13 and protrudes backward by the backward movement of the spoiler rod 12.

Further, the spoiler rod 12 is moved backward and upward by the structure made by the guide protrusion 19, the guide flange 20, the roller shaft 24, and the guide slot 22, and accordingly, the spoiler panel 14 protrudes backward and moves upward to a predetermined height.

The defect that the height of a vehicle from the ground reduces is removed by the spoiler panel 14 moving upward, so it is possible to prevent the spoiler panel 14 from coming in contact with objects on the ground.

Further, the shield panels 18 close the spaces between the rear bumper 13 and the spoiler panel 14 that have protruded backward, so it is possible to more increase the aerodynamic performance and also prevent inflow of foreign substances from the outside.

Further, since the present invention provides a configuration that can change the amount of backward protrusion of the spoiler panel 14 in accordance with the vehicle speed, it is possible to achieve the optimum aerodynamic performance in accordance with the vehicle speed.

According to the exemplary embodiment of the present invention as described above, the spoiler panel 14 functions as a rear bumper when a vehicle is in stop and traveling at a low speed, and it functions as a spoiler by protruding from the rear bumper 13 when a vehicle travels at a high speed. Further, the amount of backward protrusion of the spoiler panel 14 actively changes in accordance with the vehicle speed. Therefore, the exemplary embodiment of the present invention can achieve the optimum aerodynamic performance in accordance with the vehicle speed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spoiler apparatus for a rear bumper of a vehicle, comprising:
   a spoiler rod that is selectively movable forward/backward through a hole of a rear back beam; and
   a spoiler panel coupled to a rear end of the spoiler rod and selectively engaged with the rear bumper,
   wherein the spoiler panel separates and protrudes backward from the rear bumper, as the spoiler rod moves backward.

2. The spoiler apparatus of claim 1, further comprising:
   an actuating unit connected to the spoiler rod to selectively transmit power to the spoiler rod in order to move the spoiler rod forward or backward;
   a control unit controlling an operation of the actuating unit; and
   an input unit transmitting an input signal related to the vehicle speed to the control unit.

3. The spoiler apparatus of claim 1, further comprising:
   shield panels connected to the rear bumper and the spoiler panel to cover openings between the rear bumper and the spoiler panel, when the spoiler panel separates from the rear bumper and protrudes backward.

4. The spoiler apparatus of claim 3, wherein the shield panels are extendable members that selectively change in length in accordance with an amount of backward protrusion of the spoiler panel.

5. The spoiler apparatus of claim 3, wherein the shield panels include a lower shield panel connecting a lower end of the rear bumper and the lower end of the spoiler panel so as to prevent inflow of external air and foreign substances by cutting connection with the outside when the spoiler panel has protruded backward.

6. The spoiler apparatus of claim 3,
   wherein the shield panels include an upper shield panel, and
   wherein a plurality of holes that discharge air in the rear bumper to the outside when the spoiler panel has protruded backward are formed in the upper shield panel connecting an upper end of the spoiler panel and the rear bumper.

7. The spoiler apparatus of claim 1, wherein the spoiler panel protrudes while moving upward in order to prevent a reduction of a height of the vehicle from a ground, when protruding backward.

8. The spoiler apparatus of claim 7,
wherein a guide protrusion that protrudes downward is formed at the spoiler rod to guide the spoiler panel to protrude backward and upward, and
wherein a guide flange guiding the guide protrusion to move upward in contact with the guide protrusion is fitted in the hole formed in the rear back beam through which the spoiler rod is disposed.

9. The spoiler apparatus of claim 8, wherein the hole formed through the rear back beam has a height larger than a thickness of the spoiler rod to move up the spoiler rod protruding backward.

10. The spoiler apparatus of claim 8, wherein a one side of the guide protrusion which comes in contact with the guide flange when the spoiler rod moves backward is an inclined surface for an inclined movement of the spoiler rod protruding backward.

11. The spoiler apparatus of claim 10,
wherein a sub-guide assembly that additionally guides the spoiler rod to stably move upward and backward is provided for the spoiler rod and the rear back beam, and
wherein the sub-guide assembly includes:
a back beam bracket combined with the rear back beam;
a guide bracket combined with the back beam bracket and having a guide slot formed along a backward and upward movement path of the spoiler rod;
a roller shaft disposed through the guide slot to be movable along the guide slot; and
a roller shaft bracket having one end coupled to the spoiler rod and another end where the roller shaft is rotatably coupled.

12. The spoiler apparatus of claim 11, wherein the guide slot includes:
a straight section extending forward and backward in an axial direction of the spoiler rod; and
an inclined section extending from the straight section, at a same angle as the inclined surface of the guide protrusion.

13. The spoiler apparatus of claim 7,
wherein a guide box protruding backward and opening backward is fixed to a back panel ahead of the rear back beam, and
wherein a front portion of the spoiler rod is inserted into the guide box and additionally guides the spoiler rod to stably move backward.

14. The spoiler apparatus of claim 1, wherein the spoiler panel keeps a same level as the rear bumper at a predetermined vehicle speed or less, and protrudes backwards from the rear bumper at a speed higher than the predetermined vehicle speed.

15. The spoiler apparatus of claim 14, wherein an amount of protrusion of the spoiler panel changes in accordance with a vehicle speed.

16. A spoiler apparatus for a rear bumper of the vehicle, comprising:
a spoiler panel that keeps a same level as the rear bumper of the vehicle at a predetermined vehicle speed or less, and that protrudes from the rear bumper at a speed higher than the predetermined vehicle speed.

17. The spoiler apparatus of claim 16, wherein an amount of protrusion of the spoiler panel changes in accordance with a vehicle speed.

* * * * *